United States Patent [19]

Selzer

[11] Patent Number: 5,075,843
[45] Date of Patent: Dec. 24, 1991

[54] METHOD AND APPARATUS FOR PROCESSING GRAPHICAL INFORMATION

[75] Inventor: Gary M. Selzer, Newtown, Pa.

[73] Assignee: AT&T Bell Laboratories, Murray Hill, N.J.

[21] Appl. No.: 368,934

[22] Filed: Jun. 21, 1989

Related U.S. Application Data

[63] Continuation of Ser. No. 67,897, Jun. 29, 1987, abandoned.

[51] Int. Cl.$^5$ .............................................. G06F 15/62
[52] U.S. Cl. .................................... 395/500; 364/514
[58] Field of Search ............... 364/514, 518, 521, 900, 364/200; 382/57, 27, 41; 340/723, 724, 731, 735

[56] References Cited

U.S. PATENT DOCUMENTS

| | | | |
|---|---|---|---|
| 4,395,700 | 7/1983 | McCubbrey et al. | 364/900 |
| 4,432,047 | 2/1984 | Okayama | 364/147 |
| 4,467,409 | 8/1984 | Potash et al. | 364/200 |
| 4,496,944 | 1/1985 | Collmeyer et al. | 340/723 |
| 4,725,966 | 2/1988 | Darby et al. | 364/518 |
| 4,757,461 | 7/1988 | Stöhr et al. | 364/518 |

OTHER PUBLICATIONS

Unix System V, Release 2.0 User Reference Manual, AT&T, Nov. 1983.

Primary Examiner—Parshotam S. Lall
Assistant Examiner—V. Trans
Attorney, Agent, or Firm—Robert B. Levy

[57] ABSTRACT

Successive graphical segments in a stream of graphical information are processed by first storing each segment within a storage register (12). Thereafter, the stored graphical segment is then acted upon by at least one combinational logic array (16) configured of at least one network (24-1 ... 24-n), each network being comprised of at least one logic device (26,30). Each logic device performs a prespecified processing operation, such as, for example, a test or a modification, to the stored graphical segment. The prespecified processing operation is dictated by a separate one of a set of rules by which each network is to process the graphical segment. Once the graphical segment has been processed by the logic devices in each of the networks of the combinational logic array, the processed graphical segment is written to an output buffer for subsequent display or storage.

4 Claims, 3 Drawing Sheets

METHOD AND APPARATUS FOR PROCESSING GRAPHICAL INFORMATION

This application is a continuation of application Ser. No. 067,897, filed on June 29, 1987 now abandoned.

TECHNICAL FIELD

This invention relates to a method and apparatus for processing each of a plurality of graphical segments within a stream of graphical information in accordance with a set of predefined rules.

BACKGROUND OF THE INVENTION

In many electronics manufacturing facilities, circuit boards are often partially or even fully assembled by hand. Operators are stationed at various positions along an assembly line to mount one or more particular components to each board. To aid each operator, a color television monitor or other type of display device is now provided to display an image of the circuit board to illustrate what component is to be mounted and where. Usually, computer-aided design (CAD) data, generated during the design of the particular circuit board, is utilized to generate the graphical information displayed to the operator. Prior to displaying the image of the circuit board to the operator, it is often useful to process the constituent graphical segments comprising the graphical information representing the image. For example, it may be useful to process the segments to modify or change them in some way in order to change the physical characteristics (e.g., size and shape) as well as the attributes (e.g., location and color) of all or part of the image observed by the operator. In some instances, it may be useful to process the graphical segments to simply test their characteristics without making any modifications thereto.

Presently, there are two techniques for processing a stream of graphical information so as to test as well as modify one or more of the constituent graphical segments. One approach is to utilize a conventional, interactive graphical editor which allows an operator to individually process each graphical segment while simultaneously seeing the change on a display device. However, present day graphical editors lack the ability to translate a particular task into a rule which the editor would act upon to perform the same operation on each of the graphical segments having the same characteristics.

The other approach is to utilize a custom program designed to perform a specific processing task on all of the graphical segments having the same characteristics. During execution of the custom program, the stream of graphical information is first scanned to identify all of the graphical segments having specified characteristics. Each of the graphical segments having the specified characteristics is then automatically processed in a particular manner specified by the program. The disadvantage of using a custom program to process graphical information is that such programs tend to be task specific. Thus, to perform different processing operations on all of the graphical segments in the stream may require several different custom programs. Creating and successfully debugging a custom program for editing a graphical segment is a time-consuming process and usually requires the services of a skilled programmer.

Thus there is a need for a technique for processing the graphical segments in a stream of graphical information in accordance with a set of rules so that different editing operations can be performed on like graphical segments without resorting to using custom programs for this task.

BRIEF SUMMARY OF THE INVENTION

The foregoing disadvantages are substantially overcome by the method of the present invention for processing the graphical segments contained in a stream of graphical information. The method is initiated by storing a graphical segment contained within the stream of graphical information in an incoming segment register. The graphical segment within the segment register is acted upon by at least one combinational logic array containing at least one network which contains at least one logic device. Each logic device within each network processes the graphical segment in a manner established by the way in which the device is intialized. In this way, the graphical segments are acted upon by each network in accordance with a predefined rule established at the outset of a processing operation. Upon completion of the processing of the graphical segment by the logic devices in each of the networks within each combinational logic array, the graphical segment is written to an output storage buffer so that the segment can be available for display.

The virtue of processing the graphical segments in the foregoing manner is that a series of different processing operations can be automatically performed on the segments in succession. Each different processing task is performed on the segment by a separate one of the networks. Thus, by providing a plurality of separate networks within each combinational logic array, a plurality of different processing operations can be performed. Since the manner in which the networks process the graphical segments is dependent on how the individual logic devices are initialized, a high degree of flexibility is afforded.

In accordance with another aspect of the invention, the processing of the graphical segment by each logic device takes the form of performing a prespecified test on, or a prespecified modification to, the graphical segment. The nature of the test or nature of the modification performed by the logic device is established by initializing the device in accordance with the rule prescribing the manner in which the network is to process the graphical segment.

In accordance with another aspect of the invention, the processing of the graphical segment by the logic devices within each network takes the form of performing a sequence of tests on the device and then performing a sequence of modifications thereto. The sequence of modifications is not performed unless the results of each of the sequence of tests are true. In this way, the graphical segment is only modified if it possesses prescribed characteristics, as determined from the sequence of performed tests.

DETAILED DESCRIPTION

Figure 1:
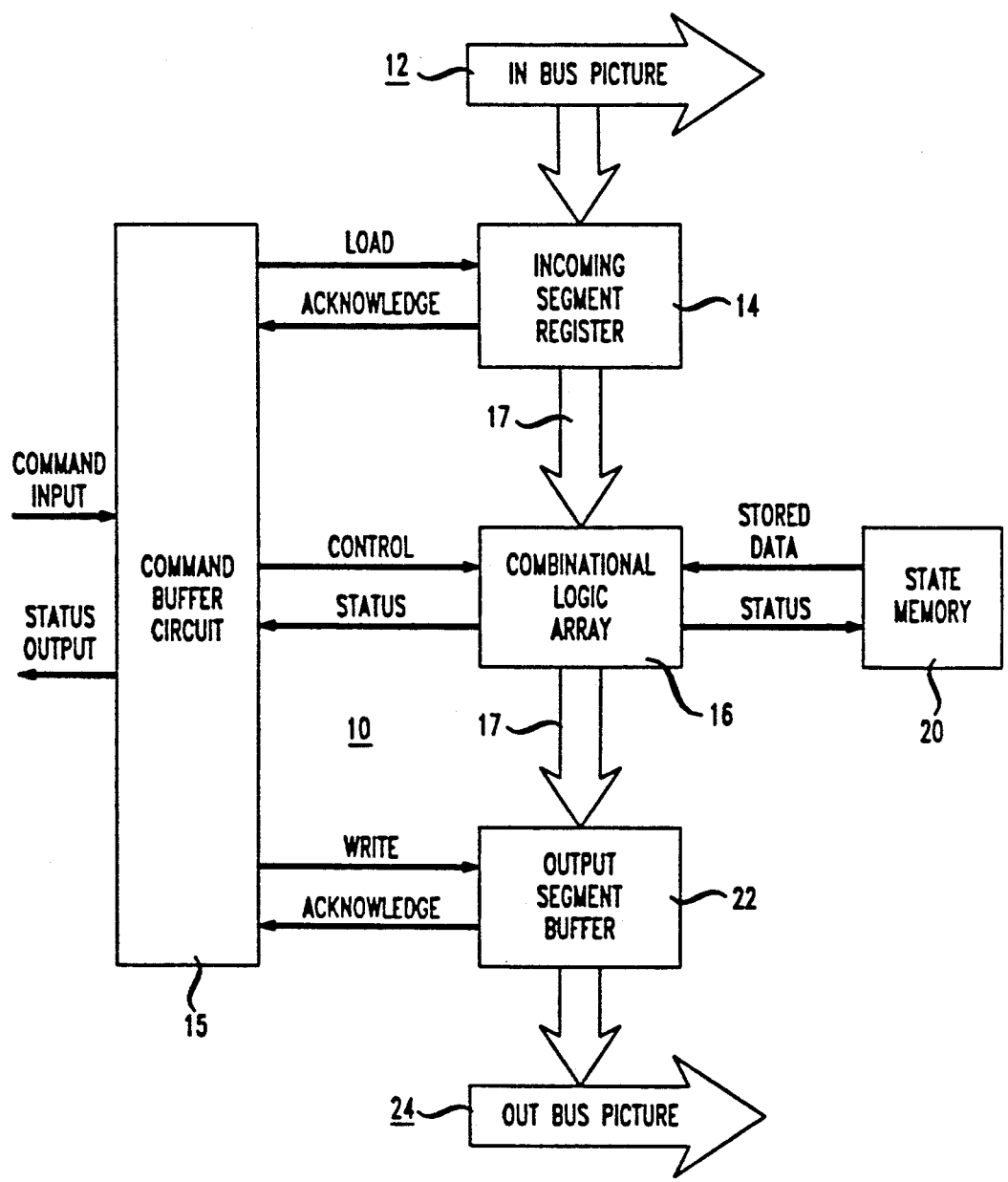
FIG. 1 is a block schematic diagram of an apparatus, constructed in accordance with the teachings of the present invention, for processing individual graphical segments contained within a stream of graphical information.

FIG. 1 is a block diagram of a system 10, in accordance with the present invention, for processing graphical information carried along an incoming picture bus 12. The graphical information carried on the bus 12 is typically comprised of a plurality of graphical segments, each taking the form of a group of digital words (blocks of binary data bits) describing both the physical characteristics and the attributes of a particular object within the image. For example, if a stream of graphical information represents the image of a circuit board (not shown), then the individual parts of the board, such as components thereon, are each represented by one or more graphical segments.

The system 10 comprises an incoming segment register 14 which stores a successive one of the constituent graphical segments within the stream of graphical information carried on the bus 12. The segment register 14 reads in each graphical segment from the bus 12 in response to a LOAD signal generated by a command buffer circuit 15, typically a programmable logic array or the like, which serves to receive and store external command inputs that are subsequently executed to produce control signals, such as the load signal. Upon completing a read operation, the register 14 sends a signal ACKNOWLEDGE to the command buffer circuit 15.

Figure 2:
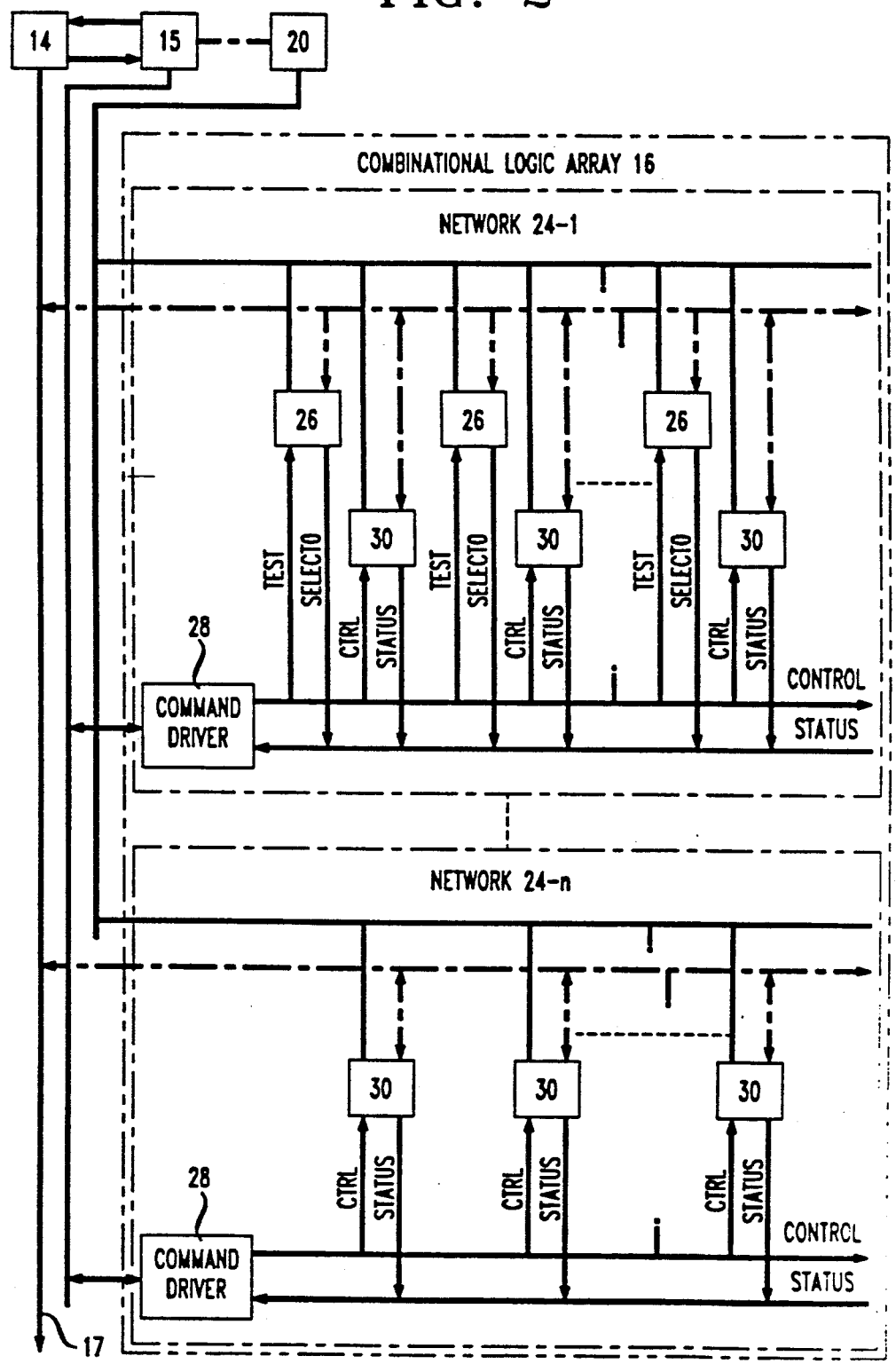
FIG. 2 is a block schematic diagram of a combinational logic array comprising a portion of the apparatus of FIG. 1.

A combinational logic array circuit 16, described in greater detail in FIG. 2, is coupled to the register 14 via a bus 17 for processing the stored graphical segment, for example, to perform one or more tests thereon, or perform one or more modifications thereto, or a combination of such actions, in accordance with a set of prescribed rules, each rule prescribing the actions to be taken. The rules by which the combinational logic array 16 processes the graphical segment stored in the register 14 are determined in accordance with control signals supplied from the command buffer circuit 15 prior to the processing operation. By changing the control signals, the rules by which the combinational logic array 16 processes the data can be easily changed, thereby affording greater flexibility than could be achieved by processing the graphical segments by the use of a processor (not shown) executing a custom program. The combinational logic array 16 also serves to supply the command buffer circuit 15 with status information indicative of the processing of the stored graphical segment.

Although the system 10 is shown with only one combinational logic array 16, it may be useful to provide the system with additional combinational logic arrays, each adapted to process only a single one of the graphical segments. It may also be useful to provide one or more combinational logic arrays 16 which serve to perform a processing operation, such as creating a graphical segment, before any of the graphical segments are read from the bus 12.

A state memory 20 is coupled to the combinational logic array 16 for storing the status information generated thereby and for returning this information to the combination logic array for use thereby during processing of the graphical segment. As seen in FIG. 2, the state memory 20 is directly coupled to the command buffer circuit 15 to supply the same with the stored status information. In practice, the stored status information furnished to the state memory 20 includes a count, indicating the number of segments processed, and a bit, referred to as a DELETE bit, indicating whether the graphical segment processed by the array 16 is to be discarded or not. The segment count stored in the state memory 20 is updated after each graphical segment has been processed.

The bus 17 couples the incoming segment register 14 to an output segment buffer 22. Once the graphical segment stored in the register 14 has been processed by the combinational logic array 16, the processed segment is written to the buffer 22. The processed graphical segment stored in the buffer 22 is written onto an outgoing picture bus 24 for transmission to a display device or storage device (not shown) in response to a WRITE signal from the command buffer circuit 15. After the register 22 has written the graphical segment to the bus 24, the register sends a signal ACKNOWLEDGE to the command buffer circuit 15.

FIG. 2 illustrates the details of the combinational logic array 16. The combinational logic array 16 is comprised of at least one, and possibly a plurality of networks 24-1 ... 24-n, only a pair of networks 24-1 and 24-n being shown for the sake of simplicity. The networks 24-1 ... 24-n serve to process the graphical segment stored in storage register 14 in sequence in accordance with a separate one of a set of rules which prescribe how the segment is to be processed. The rule prescribing how each of the networks 24-1 ... 24-n is to process the graphical segment stored in the storage register 14 dictates, in part, how each network is configured.

Assume, for example, that the rule under which the network 24-1 is to process the stored graphical segment specifies that only those of the graphical segments having certain characteristics are to be processed in a particular manner. Under these circumstances, the network 24-1 would include at least one and possibly several predicate logic devices 26, which may take the form of a comparator or a programmable logic array (not shown) adapted to perform a particular test on the graphical segment stored in the register 14. To enable each predicate logic device 26 to perform a test on a specified graphical segment, identified by the segment number, each predicate logic device is coupled to the state memory 20 to receive such data.

The predicate logic devices 26 within the network 24-1 are controlled by a command driver circuit 28, typically a programmed logic array. The command driver circuit 28 has two functions, the first being to supply the predicate logic devices 26 with an initial set of control signals at the outset of a processing operation to initialize or program each predicate logic device to establish the nature of the test performed thereby. The initialization of the predicate logic devices 26 by the command driver circuit 28 is controlled by commands supplied to the circuit by the command buffer driver 15. The second function of the command driver circuit 28 is to actuate the appropriate predicate logic devices 26 in sequence in response to commands from the command buffer circuit 15.

Generally, the predicate logic devices 26 are programmed to perform either a range list test or a string pattern match test. For example, a predicate logic device 26 may be programmed to perform a test "x-seg-loc 3000-4000, 5000-6000, and 7000-9000," to determine whether the x location of the stored graphical segment is within one of the specified ranges inclusive. Alternatively, the predicate logic device 26 could be programmed to perform a string pattern match test, such as the test "text xxx" for example, which would cause the predicate logic device to determine whether the graphical segment was a line of text containing the string "xxx." Once each predicate logic device 26 has completed the particular test for which it has been programmed, the predicate logic device returns to the command driver circuit 28 a signal SELECT$\phi$ reflective of the test results. A NEGATE flag may be set within each predicate logic device 26 in accordance with the inverse of the SELECT$\phi$ signal to reflect the inverse of the test result.

In addition to the predicate logic devices 26 and the command driver circuit 28, the network 24-1 contains at least one, and possibly several action logic devices 30, each typically comprised of a programmable logic array. The action logic devices 30 each serve to perform a particular action, such as modifying the stored graphical segment, providing output status information, or modifying the operation of the command buffer circuit 15, in response to a control signal from the command driver circuit 28. As an example, a particular one of the action logic devices 30 might serve to take the action "set-color blue" which changes the original color of the stored graphical segment to blue. The action to be taken by each of the action logic devices 30 is determined by the manner in which each is initialized. As with the predicate logic devices 26, the action logic devices 30 are initialized at the outset of a processing operation in response to a set of control signals received from the command driver circuit 28. The initial control signals furnished by the command driver circuit 28 to the action logic devices 30 are determined in accordance with the command input signal supplied from the command buffer circuit 15.

In addition to initializing the action logic devices 30, the command driver circuit 28 also serves to sequentially actuate each of the devices in the appropriate order once processing of the graphical segment is to begin. The action logic devices 30 within the network 24-1 are only actuated when the signal SELECT$\phi$ returned by each of the predicate logic devices 26 is true. Thus, only when the stored graphical segment has been tested by the predicate logic devices 26 and has been found to have certain requisite characteristics, will the action logic devices 30 undertake the action for which they have been programmed. In the event that each action logic device 30 has been actuated by the command driver circuit 28, then each action logic device returns a STATUS signal which becomes true once the action has been taken. The status information returned by the action logic device 30 may also contain information about the particular segment itself.

Depending on the rule to be followed in processing the stored graphical segment, the networks 24-2...24-n within the combinational logic array 16 need not be configured the same as the network 24-1. As an example, when the rule to be followed dictates that the stored graphical segment is to be modified regardless of its characteristics, then network 24-n could be substituted for network 24-1. The network 24-n differs from the network 24-1 by virtue of the lack of any predicate logic devices 26. Since the network 24-n is to process the stored graphical segment regardless of its characteristics, there is no need to test the characteristics of the segment, and hence no need for any of the predicate logic devices 26. In all other respects, the overall structure of the network 24-n is identical to the network 24-1, although the exact number of action logic devices 30 contained therein may be different.

Figure 3:
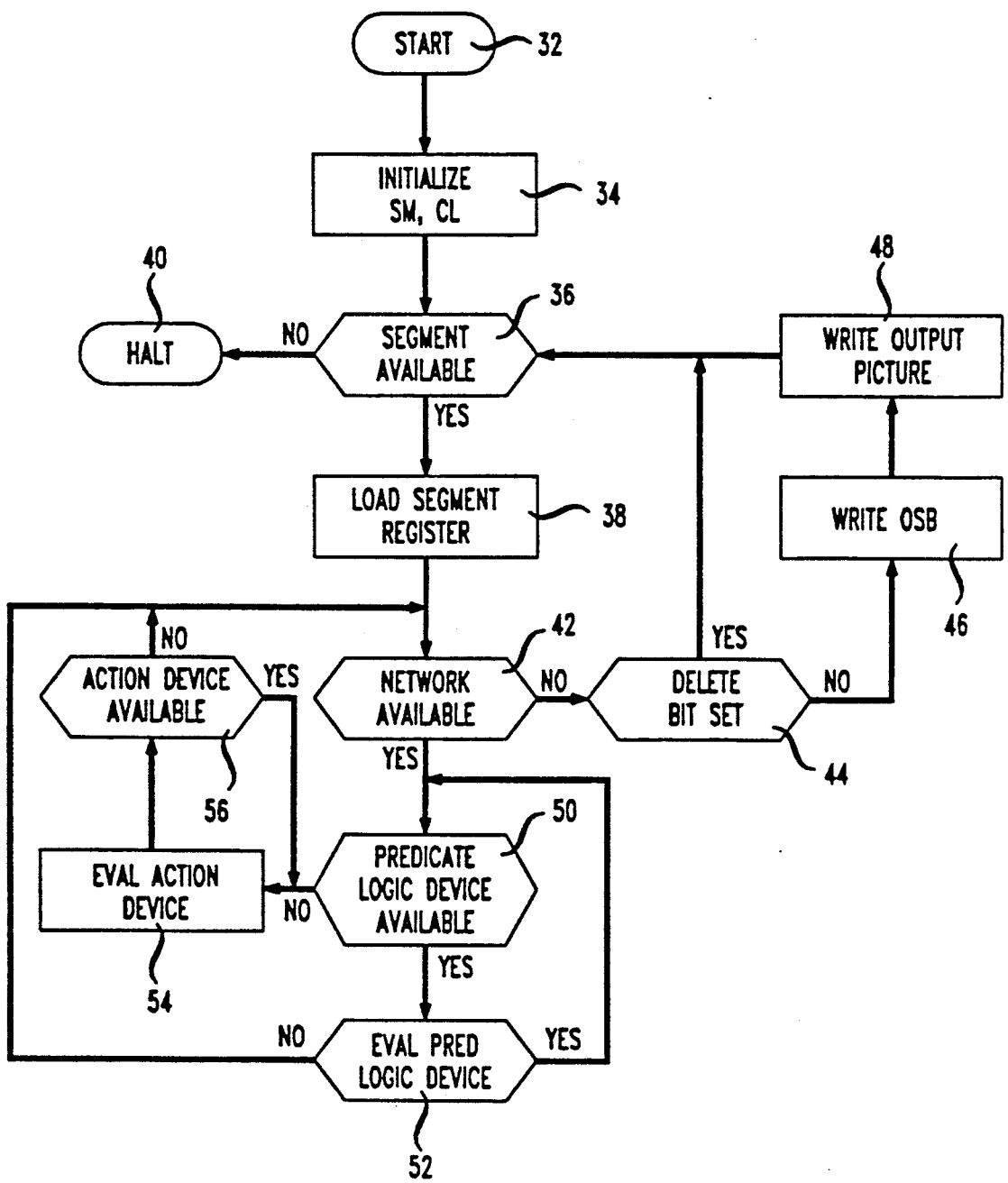
FIG. 3 is a flow chart diagram illustrating the operation of the apparatus of FIG. 1.

Referring to FIG. 3, there is shown a flow chart representation of the steps executed during the operation of the system 10 of FIG. 1. Operation of the system 10 is begun in response to a start command received by the command buffer circuit 15 of FIG. 1 (step 32). In response to the start command, the command buffer circuit 15 initializes the combinational logic array 16 by sending the appropriate commands to the individual networks 24-1...24-n to program (i.e., initialize) the various predicate logic devices 26 and the action logic devices 30 therein (step 34). Also during step 34, the command buffer circuit 15 initializes the state memory 20.

Next, the command buffer circuit 15 checks whether a graphical segment is available from the bus 12 for processing (step 36). The command buffer circuit 15 accomplishes this task by checking whether there has been a failure to load a graphical segment into the register 14. Such a failure occurs where there are no more segments on the bus 12. In the event that there are no further graphical segments available, then following step 36, the command buffer circuit 15 halts all further operations (step 40).

If further graphical segments are available, then the command buffer circuit 15 checks to see if any of the networks 24-1...24-n are available, that is, if there are additional networks which have yet to perform their particular processing operation on the stored graphical segment (step 42). Initially, all of the networks 24-1...24-n are available. However, after each of the networks 24-1...24-n performs its processing operation on the stored graphical segment, the network is no longer available. If none of the networks 24-1...24-n are available (the stored graphical segment has been processed by all of them), then the command buffer driver 15 checks the status memory 20 to determine whether the bit DELETE has been set (step 44).

If the DELETE bit has been set, indicating that the processed graphical segment is to be discarded, then step 36 and those following it are re-executed. Otherwise, the processed graphical segment is written to the output storage buffer 22 (step 46). Thereafter, the processed graphical segment stored in the output storage buffer 22 is written onto the bus 24 (step 46). After the processed graphical segment has been written onto the bus 24, then step 36 and those following it are re-executed.

It may be that during execution of step 42, one or more of the networks 24-1...24-n may be found to be available. If so, then the command buffer driver 15 proceeds to examine the first (lowest-order) one of the available networks 24-1...24-n to determine if any of the predicate logic devices 26 therein are available (step 50). Should there be one or more available predicate logic devices 26, then the first available predicate logic device is actuated and the results of the test performed thereby are evaluated (step 52). If the just-actuated predicate logic device 26 has returned a SELECT$\phi$ signal which is true, then step 50 is re-executed. In this way, the predicate logic devices 26 with each of the networks 24-1...24-n are actuated in the appropriate sequence until of the devices returns a false SELECT$\phi$ signal, in which case, step 42 is re-executed.

In the event that none of the predicate logic devices 26 are found available during step 50, then the first available (lowest-order) action logic device 30 (if any)

in the network now under scrutiny is actuated and the state of its status signal is evaluated (step 54). Once this action logic device 30 has returned a status signal indicating that it performed the requisite action, such as modifying the stored graphical segment in the prescribed manner, then a check is made if other action logic devices are available (step 56). In other words, the command driver circuit 28 checks to see whether there are any remaining action logic devices 30 that have yet to be actuated. If so, then step 56 is re-executed and the next lowest order action logic device 30 is actuated. Once no more action logic devices 30 are found available during step 56, then step 42 is re-executed.

As may be appreciated from the foregoing description, each of a plurality of selected graphical segments can be processed sequentially in an automatic fashion. Moreover, a high degree of flexibility is present because the rules by which the processing of the segments is accomplished can be readily changed by changing the manner in which the predicate logic devices 26 and the action logic devices 30 are initialized.

It is understood that the embodiments herein described are merely illustrative of the principles of the present invention. Various modifications and changes may be made thereto by those persons skilled in the art which will embody the principles of the invention and fall within the spirit and scope thereof.

What is claimed is:

1. A method for processing at least one block of graphical data within a stream of graphical data blocks, each block representing a separate one of a plurality of graphical segments which collectively comprise a graphical image, the method comprising the steps of:

initializing at least one combinational logic array containing a plurality of predicate logic elements, which each performs a separate test upon a block of graphical data, and containing a plurality of action logic elements which each performs an action upon the block of graphical data in accordance with the tests performed by the predicate logic elements the combinational logic array being initialized in response to a user-entered input signal such that the type and sequence of tests performed by the predicate logic elements, and the type and sequence of actions performed by the action logic elements are established in accordance with a user-defined rule;

storing the graphical data block in a register;

acting upon the stored graphical data block by the combinational logic array;

writing the stored graphical data block into an output storage buffer after the stored block has been acted upon by the combinational logic array.

2. The method according to claim 1 wherein the predicate logic elements all operate to sequentially test the block of data.

3. The method according to claim 1 wherein the action logic elements all operate to sequentially act upon the block of data.

4. Apparatus for automatically processing at least one block of graphical data within a stream of graphical data blocks, each block comprising a separate one of a plurality of graphical segments which collectively comprise a graphical image, the apparatus comprising:

first storage means for storing a block of graphical data;

at least one combinational logic array containing a plurality of predicate logic elements each being capable of performing a separate test upon a block of graphical data, and containing a plurality of action logic elements each being capable of performing an action upon the block of data in accordance with the tests performed by the predicate logic elements;

control means for supplying a user-entered initializing signal to the combinational logic array to establish, pursuant to a user-defined rule, what test each of the predicate logic elements is to perform, and in what sequence, and what action each of the action logic elements is to perform, and in what sequence; and second storage means for storing the graphical data block which has been acted upon by the combinational logic array.

* * * * *